Figure 1:
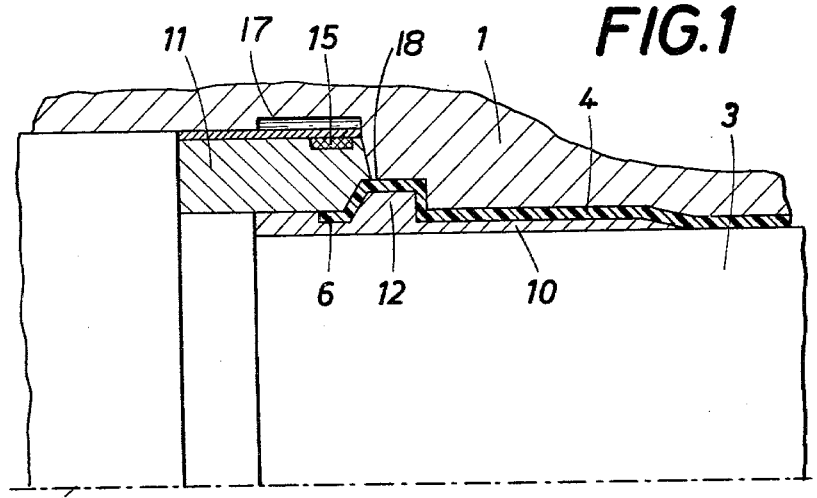

United States Patent [19]

Anger

[11] 4,353,522
[45] Oct. 12, 1982

[54] INJECTION MOLD FOR MAKING A SYNTHETIC THERMOPLASTIC ARTICLE HAVING A TUBULAR END PORTION

[75] Inventor: Anton Anger, Linz, Austria

[73] Assignee: Oesterreichische Schiffswerften Aktiengesellschaft Linz-Korneuburg, Linz, Austria

[21] Appl. No.: 193,149

[22] Filed: Oct. 2, 1980

[30] Foreign Application Priority Data

Oct. 11, 1979 [AT] Austria .................................. 6616/79

[51] Int. Cl.³ ............................................... B79C 7/00
[52] U.S. Cl. ........................... 249/144; 425/DIG. 218; 425/DIG. 58; 425/398
[58] Field of Search ............. 425/DIG. 58, DIG. 218, 425/398; 249/144

[56] References Cited

U.S. PATENT DOCUMENTS

| | | | |
|---|---|---|---|
| 3,020,594 | 2/1962 | Makowski | 425/DIG. 58 |
| 3,861,847 | 1/1975 | Barnett | 425/DIG. 218 |
| 3,915,613 | 10/1975 | Ruch | 425/DIG. 58 |
| 3,998,578 | 12/1976 | Acda | 425/DIG. 218 |
| 4,065,243 | 12/1977 | Acda et al. | 425/DIG. 218 |
| 4,127,632 | 11/1978 | Auger | 425/DIG. 218 |
| 4,161,384 | 7/1979 | McGregor | 425/DIG. 218 |

*Primary Examiner*—J. Howard Flint, Jr.
*Attorney, Agent, or Firm*—Kurt Kelman

[57] ABSTRACT

An injection mold comprises an outer mold structure defining an abutment surface and a core axially slidable in this structure between a molding position and a second position. The core defines a mold cavity with the outer mold structure in the molding position to mold a tubular end portion of a synthetic thermoplastic resin article therein. The core includes an annular rib defining an internal peripheral annular groove of the end portion and an end to which a mold sleeve is axially immovably connected. The mold sleeve has an end face facing and conforming to the abutment surface upon axial sliding of the core into the molding position. The mold sleeve and core end have converging confronting surfaces defining an annular gap tapering toward the core end, the annular gap defining a free end of the tubular end portion extending outwardly from an annular section thereof surrounding the groove. The core and mold sleeve are jointly axially slidable into the second position for removing the free end from the annular gap with elastic deformation.

3 Claims, 3 Drawing Figures

INJECTION MOLD FOR MAKING A SYNTHETIC THERMOPLASTIC ARTICLE HAVING A TUBULAR END PORTION

This invention relates to an injection mold for making synthetic thermoplastic resin fittings and pipe connectors which comprise at least one tubular end portion formed with an internal peripheral annular groove spaced from the free end of the tubular end portion. The mold comprises a core and an outer mold structure consisting of two or more mold members. When the mold is closed, the core and outer mold structure define a cavity for the fitting. The core is longitudinally shiftable to remove the tubular end portion from the mold. An annular rib for molding the annular groove is connected to the core so as to be immovable relatively thereto at least in the longitudinal direction of the core. A sleeve is provided for molding the outside of the tubular end portion from its free end to its largest diameter at the annular groove.

Injection molds of this kind distinguish from all other injection molds having the same object by having a relatively simple structure. The depth of the annular groove is larger than the wall thickness of the tubular end portion and is of an order of 10% of the inside diameter of the tubular end portion or, when the tubular end portion has an inside diameter above 50 mm, amounts to at least 5 mm. A special property of synthetic thermoplastic resin is utilized for the removal of the annular groove and the adjoining free end of the tubular end portion from the mold. This property is described as the thermoplastic deformability which permits strong deformation in a certain temperature range and is characteristic for material which, after the deformation, returns owing to the so-called memory effect to the shape in which it has been molded.

It was previously believed that the free end of the tubular end portion could not be satisfactorily removed from the mold unless said free end is completely released on its outside before the core is extracted so that that free end is subjected to the thermoelastic deformation by the annular rib which is extracted with the core. To that end, the outer mold structure, which usually is composed of several parts, is opened to such an extent before the extraction of the core that the annular rib is free to leave the sleeve end. Alternatively, the above mentioned mold member which is adjustable in the longitudinal direction of the core consists of a separate sleeve which is guided on the core and connected to a shifting mechanism provided with coupling elements for driving the core. As that sleeve is extracted, it does not carry the core along until the sleeve has released the outside of the free end of the tubular end portion. That sleeve serves in that case only to exert on the core the entire force used to extract the core. For this reason the sleeve has to be sufficiently thick-walled. To extract the core, the coupling elements of the sleeve engage stops carried by the core. It must be ensured that, in the operating position required for the injection molding operation, the core and sleeve assume exactly predetermined positions. Difficulties may arise owing to the fact that said parts must be relatively movable. Besides, the mold must be made to close tolerances. Because the sleeve must be relatively large in diameter, large bores are required in the mold and the latter is relatively large relative to the end product. In the making of acute-angled junction fittings, it may be difficult or impossible to accommodate the sleeve or mold bore in an injection mold of the previous type so that different injection molds must then be used, e.g., molds having core rings which can be detached or infolded.

It is an object of the invention further to simplify an injection mold of the kind described first hereinbefore and to eliminate the difficulties pointed out.

That object is accomplished in that the sleeve is also connected to the core so as to be immovable relative thereto at least in the longitudinal direction of the core so that, when the tubular end portion is to be removed from the mold, the free end of the tubular end portion can be extracted with elastic deformation from the annular gap defined by the sleeve and core.

The invention is based on the surprising recognition that the tubular end portion can be removed from the mold in the above-mentioned manner when the annular groove has any of several of the most frequent cross-sectional shapes, provided that the removal from the mold is effected at the proper temperature.

The removal from the mold will be facilitated if, in accordance with a preferred further feature, the molding surfaces of the sleeve are nonparallel to the corresponding surfaces of the core so that the annular gap tapers toward the adjacent end of the core. As a result, that portion of the tubular end portion which is to be extracted from the gap will engage only one gap-defining wall after a slight initial movement so that the same result is produced as if its outside surface were entirely released.

The mold cavity can easily be tightly sealed if the sleeve has a conical end face which is adapted to be forced against a mating abutment surface of the outer mold structure in the closed mold.

Figure 2:
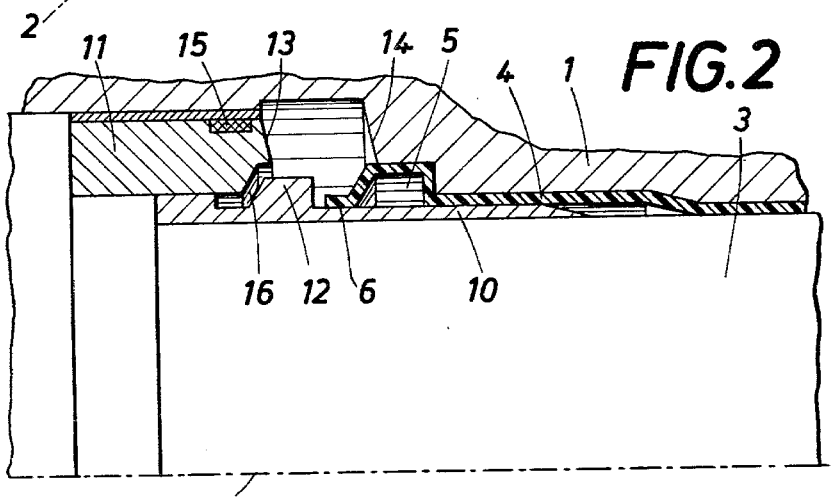
Figure 3:
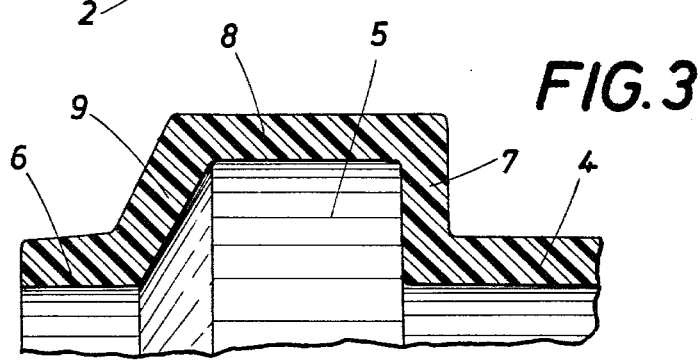

An embodiment of the invention is shown by way of example on the accompanying drawing, in which FIG. 1 shows partly in longitudinal section essential parts of the upper portion of an injection mold embodying the invention in position for injection molding, all accessories having been omitted, FIG. 2 is a view similar to FIG. 1 showing the mold in a second position in which the free end of the tubular end portion has been removed from the mold, and FIG. 3 is an enlarged longitudinal sectional view showing a portion of the free end of a tubular end portion.

The injection mold comprises a core 3 and an outer mold structure 1, which consists of two mold halves, the interface of which extends normal to the plane of the drawing and may, e.g., include the axis 2 of the core. A core set is normally provided for each tubular end portion of the desired molding. For making an arcuate fitting, two cores may be used, which define a miter joint at the apex of the arc, and for a tee fitting, three cores may be provided for the respective arms. A major part of the fitting to be made is molded in a mold portion which is not shown and adjoins on the right of the parts which are shown. That portion includes also the ports communicating with the injection molding machine. Only that region of the injection mold is shown which serves to mold a tubulr end portion 4 of the fitting, which tubular end portion is formed adjacent to its free end with an internal annular groove 5 which is normally intended to receive a sealing ring. The tubular end portion is formed at its free end with a short supporting extension 6. The annular groove 5 has a steep inner side wall 7 and a conical outer side wall 9. The parts for molding the steep side wall 7 and annular section 8 defining the annular groove are provided on the core 3 and the outer mold structure 1, for which purpose outer mold structure 1 is recessed at 18 to define a molding cavity with annular rib 12 of core 3. The parts for molding the free end consisting of the side wall 9 and the supporting extension 6 are provided on the core 3. To that end, the core 3 is recessed and rigidly connected to a core sleeve 10, and a mold sleeve 11 extends over the core sleeve 10 from the end of the core. The core sleeve 10 carries an annular rib 12 for molding the annular groove 5. The mold sleeve 11 extends over the annular rib 12 as far as to the portion which is largest in diameter. The mold sleeve 11 has a conical end face 13 which, in the closed mold, is adapted to be forced against a mating abutment surface 14 of the outer mold structure, the mold sleeve being accommodated in recessed chamber 17 of the outer mold structure. Heating means 15 can be accommodated in the end portion of the mold sleeve 11.

The mold is shown in FIG. 1 in position for injection molding. The core 3 is held in a fixed position relative to the mold halves of the outer mold structure 1. When the injection molding operation has been completed, the outer mold structure 1 remains initially closed and the core 3 is shifted to the position of FIG. 2 by means of a shifting mechanism. The actuation of the shifting mechanism can be initiated by means of a program control system when a predetermined time after the completion of the injection molding operation has elapsed or when the free end 6, 9 of the molding, has reached a predetermined temperature. As the core is thus shifted, the supporting extension 6 and the adjoining side wall 9 are extracted from the annular gap 16. Thereafter, the annular rib 12 is disposed outside the supporting extension 6. The removal from the mold is facilitated because the molding surfaces defining the annular gap are so shaped, as shown in FIG. 3, that the outer contours the free end 6, 9 are not parallel to the inner contours thereof, annular gap 16 and the wall of the tubular end portion tapering toward the free end of the tubular end portion. The supporting exenstion 6 is supported on the core sleeve 10 beside the annular rib 12. The molding is then cooled further and subsequently the core 3 is entirely extracted. Only thereafter must the outer mold structure 1 be completely opened so that the molding can be removed. The core sleeve 10 may be omitted if the core 3 has the same outer contour as the core sleeve 10 in the present embodiment; in that case the annular rib 12 is provided on the core. In special cases even the mold sleeve 11 may be integral with the core 3.

What is claimed is:

1. An injection mold for making a synthetic thermoplastic resin article having a tubular end portion with a free end and an annular section of a diameter exceeding that of the remainder of the tubular end portion axially spaced inwardly from the free end, the free end and the annular section defining an internal peripheral annular groove, the injection mold comprising an outer mold structure comprised of at least two mold members and defining an abutment surface; and a core axially slidable in the outer mold structure between a molding position and a second position, the core defining a mold cavity with the outer mold structure in the molding position to mold the tubular end portion therein, the core including an annular rib axially immovable relative thereto and defining the peripheral groove of the tubular end portion in the mold cavity, the core having an end and a mold sleeve connected to, and surrounding, the core end, the mold sleeve being axially immovable relative to the core and having an end face facing and conforming to the abutment surface, the mold sleeve end face being forced against the abutment surface upon axial sliding of the core into the molding position, the mold sleeve and core end having converging confronting surfaces defining an annular gap tapering toward the end of the core, the annular gap defining the free end of the tubular end portion in the mold cavity extending outwardly from the annular section thereof, and the core and mold sleeve axially immovably connected thereto being jointly axially slidable into the second position to permit the free end of the tubular end portion to be removed from the annular gap with elastic deformation.

2. The injection mold of claim 1, wherein the abutment surface and the end face are conically mating with each other.

3. The injection mold of claim 1, wherein the annular gap is comprised of a forwardly sloping, radially inwardly extending section adjoining the annular section and a short extension extending in the axial direction.

* * * * *